US012780318B2

(12) United States Patent
Oguzcan Ger et al.

(10) Patent No.: US 12,780,318 B2
(45) Date of Patent: Nov. 3, 2026

(54) MOUNTING SYSTEM AND METHOD FOR MOUNTING AN UPPER BODY STRUCTURE LATERALLY ONTO A VEHICLE PLATFORM OF A MOTOR VEHICLE

(71) Applicants: HYUNDAI MOTOR COMPANY, Seoul (KR); KIA CORPORATION, Seoul (KR)

(72) Inventors: Kadir Oguzcan Ger, Mainz (DE); Bahman Moarefi, Mainz (DE); Andrew Vaughan, Mainz (DE); Vincent Laurent, Frankfurt am Main (DE); Jelle Tjebbes, Frankfurt am Main (DE); Sebastian Klüh, Gimbsheim (DE); Ameya Karmarkar, Rüsselsheim am Main (DE); Rolf Verhoeven, Frankfurt am Main (DE); Miroslav Kropac, Mainz (DE)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 327 days.

(21) Appl. No.: 18/244,080

(22) Filed: Sep. 8, 2023

(65) Prior Publication Data

US 2024/0326918 A1 Oct. 3, 2024

(30) Foreign Application Priority Data

Mar. 30, 2023 (DE) ......................... 102023108081.4

(51) Int. Cl.

| | |
|---|---|
| ***B62D 24/00*** | (2006.01) |
| ***B60L 50/60*** | (2019.01) |
| ***B62D 65/00*** | (2006.01) |

(52) U.S. Cl.
CPC .............. *B62D 24/00* (2013.01); *B60L 50/60* (2019.02); *B62D 65/00* (2013.01)

(58) Field of Classification Search
CPC ......... B60L 50/60; B62D 24/00; B62D 65/00; B62D 63/025; B62D 27/06; B62D 63/04; B62D 65/04
See application file for complete search history.

(56) References Cited

U.S. PATENT DOCUMENTS

| | | | | |
|---|---|---|---|---|
| 11,144,057 | B1 * | 10/2021 | Ebrahimi Afrouzi .... | G06N 3/08 |
| 2021/0331749 | A1 * | 10/2021 | Hwang ................ | B23Q 3/1543 |

(Continued)

FOREIGN PATENT DOCUMENTS

| | | | | |
|---|---|---|---|---|
| CN | 107521383 B * | 8/2020 | ......... | B60R 21/0136 |
| DE | 102017216779 A1 * | 3/2019 | ............. | B62D 24/00 |
| DE | 102019002569 A1 * | 10/2019 | ........... | B62D 65/022 |

OTHER PUBLICATIONS

Zhai, Mingda et al., Calculation and evaluation of load performance of magnetic levitation system in medium-low speed maglev train; International Journal of Applied Electromagnetics and Mechanics, vol. 61, No. 4, pp. 519-536, 2019.

*Primary Examiner* — Tisha D Lewis
(74) *Attorney, Agent, or Firm* — Lempia Summerfield Katz LLC

(57) ABSTRACT

A mounting system is provided for mounting an upper body structure laterally onto a vehicle platform of a motor vehicle. At least one of the upper body structure and the vehicle platform are equipped with wheels to be movable laterally on the ground with regards to a longitudinal direction. The upper body structure has an engagement portion and the vehicle platform has a complementary shaped counter-engagement portion shaped to engage each other under relative lateral movement of the upper body structure and the vehicle platform towards each other thereby coupling the (Continued)

upper body structure and the vehicle platform to each other for joint longitudinal movement.

11 Claims, 6 Drawing Sheets

(56) References Cited

U.S. PATENT DOCUMENTS

| | | | | |
|---|---|---|---|---|
| 2022/0274658 | A1* | 9/2022 | Kägi | B62D 65/022 |
| 2022/0297778 | A1* | 9/2022 | Moarefi | B62D 63/025 |
| 2022/0306220 | A1* | 9/2022 | Moarefi | B62D 24/00 |
| 2023/0009002 | A1* | 1/2023 | Moarefi | B60P 1/649 |

* cited by examiner

MOUNTING SYSTEM AND METHOD FOR MOUNTING AN UPPER BODY STRUCTURE LATERALLY ONTO A VEHICLE PLATFORM OF A MOTOR VEHICLE

CROSS-REFERENCE TO RELATED APPLICATION

This application claims the benefit of and priority to German Patent Application No. 102023108081.4, filed with the German Patent and Trade Mark Office on Mar. 30, 2023. The entire contents of this prior filed application are incorporated herein by reference.

TECHNICAL FIELD

The present disclosure pertains to a mounting system and a method for mounting an upper body structure laterally onto a vehicle platform of a motor vehicle. The present disclosure further pertains to a motor vehicle, in particular an electric motor vehicle, with such a mounting system.

BACKGROUND

Recently, some manufacturers of vehicles and automotive parts have put their focus on developing standardized and scalable electric vehicle (EV) platforms to underpin future vehicles in line with a completely new vehicle architecture in order to save development time and costs and thus get new electric cars on the road faster. To this end, modular electric-rolling and ready-to-drive platforms, a.k.a. "skateboards", are specifically designed to be mated with bodies of varies types and shapes. In this approach, the vehicle platform represents the part common to all vehicles and may combine chassis, powertrain, energy storage, crash management, and so on. The upper body structure or "top hat" on the other hand comes in several variants specifically designed for different purposes according to the specific need of the customer.

Such purpose-built vehicles (PBVs) may be designed for specific applications, like last-mile delivery or autonomous shuttles. They are designed from the start with specific applications in mind. Because of the standardization efforts up front, PBVs can be produced at scale at a much lower price point than could otherwise be achieved. Purpose-built EV platforms may not only be lower in material cost but may also allow better performance in range, acceleration, and interior space. Moreover, designing the vehicle architecture entirely around an EV concept, without combustion-engine legacy elements, means fewer compromises and more flexibility on average.

With the modular separation of the vehicle structure, a need arises to swap different body structures quickly and smoothly on top of a vehicle platform. Various solutions are proposed for this and similar purposes. Such solutions include, amongst others, the MetroSnap concept by Rinspeed, the Vision URBANETIC approach by Daimler, and Scania's NXT.

SUMMARY

Hence, there is a need to find simple yet effective solutions for loading a vehicle platform with an upper body structure.

To this end, the present disclosure provides a mounting system, a motor vehicle, and a method.

According to one aspect of the present disclosure, a mounting system is provided for mounting an upper body structure laterally onto a vehicle platform of a motor vehicle. At least one of the upper body structure and the vehicle platform are equipped with wheels to be movable laterally on the ground with regards to a respective longitudinal extension. The upper body structure is configured with an engagement portion and the vehicle platform is configured with a complementary shaped counter-engagement portion. The engagement and counter-engagement portions are shaped to engage each other under relative lateral movement of the upper body structure and the vehicle platform towards each other. The upper body structure and the vehicle platform are thereby coupled to each other for joint longitudinal movement.

According to another aspect of the disclosure, a motor vehicle, and in one example an electric motor vehicle, is equipped with a mounting system according to the disclosure.

According to yet another aspect of the disclosure, a method is provided for mounting an upper body structure laterally onto a vehicle platform of a motor vehicle, for example an electric motor vehicle. The method includes moving the upper body structure and the vehicle platform laterally relative to each other via wheels provided on at least one of the upper body structure and the vehicle platform such that an engagement portion of the upper body structure engages with a complementary shaped counter-engagement portion of the vehicle platform. The upper body structure and the vehicle platform are thereby coupled to each other for joint longitudinal movement.

One idea of the present disclosure is to minimize the swapping effort for a purpose built vehicle by providing the vehicle itself with the capability to load and unload the upper body structure quickly and smoothly without the need for complex and expensive lifting mechanisms or other complicated tools, components, and/or devices. To this end, the present disclosure realizes a swapping procedure based on relative lateral movements of the upper body structure and the vehicle platform, which is made possible by providing laterally movable wheels on one or both of these vehicle parts. Additionally, both vehicle parts are configured with correspondingly formed engagement portions, which mate with each other once both vehicle parts are moved together laterally.

For example, the vehicle platform may be furnished as an electric motor vehicle that includes an electric battery driving several ball-type wheels. The vehicle platform may then approach the upper body structure, which may or may not be movable itself, such that the engagement portions meet and engage with each other and the upper body structure and the vehicle platform mate with each other. The motor vehicle thus formed may then be moved forwards and/or backwards (and/or laterally) in the normal vein as a single entity, e.g. via the wheels of the vehicle platform.

It is to be understood that the terms "vehicle" or "vehicular" or other similar term as used herein are inclusive of motor vehicles in general. Such motor vehicles may encompass passenger automobiles including sports utility vehicles (SUVs), buses, trucks, various commercial vehicles, and the like. Such motor vehicles may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example vehicles that are both gasoline-powered and electric-powered. Motor vehicles according to the disclosure include manually driven vehicles as well as more or less autonomously and/or automatically driven vehicles.

Advantageous embodiments and improvements of the present disclosure are covered by the appended claims.

According to an embodiment of the disclosure, both the upper body structure and the vehicle platform may be equipped with laterally movable wheels.

The present disclosure particularly allows to introduce a “barrier-free” swapping concept based on the same ride height principle. In other words, both the upper body structure and the vehicle platform may be configured with the same type of wheels such that both parts may have the same ride height (i.e. the amount of space between the base of the wheels and the lowest point of the vehicle chassis/body). In that sense, the upper body structure and the vehicle platform may both be moved independently such that very high flexibility can be achieved with regards to potential reconfigurations of the vehicle body structure. Traditional lifting mechanisms or other tools are not required when employing the present disclosure.

According to an embodiment of the disclosure, the wheels may be configured as ball-type wheels configured to roll into arbitrary horizontal directions.

These kinds of wheels are particularly beneficial for the present application because both vehicle parts can be moved freely relative to each other, thereby making the mating process particularly easy. Various manufacturers have proposed concepts for the realization of ball-type wheels in the recent past.

For example, Hyundai unveiled an innovative vision for urban mobility at CES 2020 for vitalizing human-centered future cities, in which an electric purpose vehicle relies on 16 electric hardware ball type wheels to move freely in any horizontal direction.

Similarly, Goodyear revealed a concept tire in the context of driverless vehicles and shared mobility in urban centers under the concept name “Eagle 360 Urban”, which is a 3-D printed spherical tire powered by Artificial Intelligence and able to sense, decide, transform, and interact.

According to an embodiment of the disclosure, the engagement portion and the counter-engagement portion may be shaped to engage each other in a form fit.

The profiles of both engagement portions along a longitudinal section of the motor vehicle may thus be adapted accordingly. Thus, both vehicle portions may be plugged together at their respective engagement portions by moving them together laterally.

According to an embodiment of the disclosure, the engagement portion and/or the counter-engagement portion may be formed as a protrusion and the respective other portion may be formed correspondingly as a recess such that the protrusion can enter the recess laterally. At least one of the protrusion and the recess may be formed with a lateral ridge fitting into a correspondingly formed lateral undercut of the respective other portion to couple the upper body structure and the vehicle platform to each other for joint longitudinal movement.

The shape of the engagement portions may thus be conveniently used to geometrically couple both vehicle parts to each other (in longitudinal direction) for joint longitudinal movement.

According to an embodiment of the disclosure, the undercut may be formed as a groove. The groove may be configured with roller wheels to facilitate lateral sliding movement of the protrusion along the recess.

For example, the groove may be covered with roller wheels along a lateral direction, whereby the roller wheels then ease the coupling procedure between the upper body structure and the vehicle platform.

According to an embodiment of the disclosure, the upper body structure and/or the vehicle platform may include an interlocking mechanism configured to interlock the upper body structure with the vehicle platform in the engaged configuration. The method may correspondingly include interlocking the upper body structure with the vehicle platform in the engaged configuration by the interlocking mechanism provided on the upper body structure and/or the vehicle platform.

A typical docking procedure between the upper body structure and the vehicle platform may thus include preparation and engagement of the two parts via the engagement portions. Then, in a further step, the docking procedure may also include interlocking both engaged parts with each other to firmly and durably couple both parts together for joint movement in any direction.

According to an embodiment of the disclosure, the interlocking mechanism may include an electromagnet configured to be activated in the engaged configuration and to generate a magnetic force pulling the upper body structure and the vehicle platform to each other. The method may correspondingly include activating the electromagnet to generate a magnetic force pulling the upper body structure and the vehicle platform to each other.

It may be sufficient to provide one electromagnet or several such electromagnets on one of the vehicle parts, e.g. on the vehicle platform. If the respective other vehicle part is formed with a metallic material (e.g. steel) in the vicinity of the electromagnet, this may then facilitate magnetic coupling of both parts together.

It should be clear to a person of ordinary skill in the art that alternatively, or additionally, one or several electromagnets may be switched on and off, and that magnetic materials may be used for the present purpose.

According to an embodiment of the disclosure, the interlocking mechanism may include a mechanical interlock configured to mechanically lock the upper body structure with the vehicle platform in the engaged configuration via mechanical locking elements. The method may correspondingly include adjusting the mechanical locking elements of the mechanical interlock to mechanically lock the upper body structure with the vehicle platform.

Such a mechanical lock may be accompanied by a magnetic interlocking solution, e.g. based on one or several electromagnets. Basic coupling may then be achieved by the magnetic force of the electromagnet. The additional mechanical lock on the other hand completes and secures the connection between both vehicle parts.

According to an embodiment of the disclosure, the mechanical locking elements may include retractable pins.

For example, such pins may be provided at the engagement portions, e.g. on a lateral groove where they may be combined in an arrangement with several roller wheels for simplified coupling.

According to an embodiment of the disclosure, the vehicle platform may include an electric battery configured to power at least one of laterally movable wheels of the vehicle platform and an interlocking mechanism of the vehicle platform.

Thus, an electric battery of the vehicle platform may be used not only to drive the vehicle platform and also the finial mounted vehicle, but also to power the interlocking mechanism, e.g. an electromagnet and/or an actuator driving retractable pins or other mechanical elements.

The disclosure is explained in greater detail with reference to embodiments depicted in the appended drawings.

BRIEF DESCRIPTION OF THE DRAWINGS

The accompanying drawings are included to provide a further understanding of the present disclosure and are incorporated in and constitute a part of this specification. The drawings illustrate embodiments of the present disclosure and together with the description serve to explain the principles of the disclosure. Other embodiments of the present disclosure and many of the intended advantages of the present disclosure should be more readily appreciated as they become better understood by reference to the following detailed description. The elements of the drawings are not necessarily to scale relative to each other. In the figures, like reference numerals denote like or functionally like components, unless indicated otherwise.

Although specific embodiments are illustrated and described herein, it should be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

DETAILED DESCRIPTION OF THE EMBODIMENTS

Figure 1:
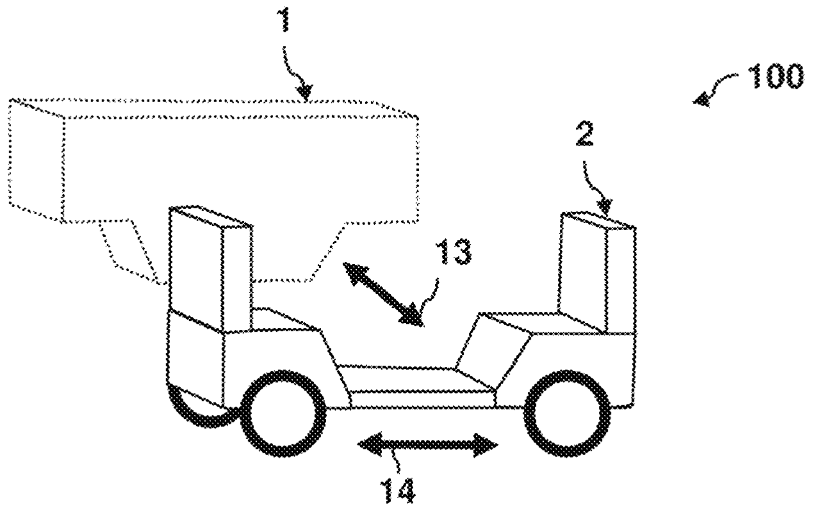
FIG. 1 schematically depicts a modular motor vehicle having a vehicle platform that can be equipped with a purpose-built upper body structure.

FIG. 1 schematically depicts a modular motor vehicle 100 having a vehicle platform 2 that can be equipped with a purpose-built upper body structure 1.

The motor vehicle 100 may be, for example, a purpose-built electric vehicle (EV) that is designed in a modular fashion based on two main parts, namely the vehicle platform 2 or skateboard and the upper body structure 1 or top hat. The vehicle platform 2 represents the common substructure of the EV including chassis, powertrain, electric batteries and so on. The upper body structure 1 on the other hand may come in different variants fulfilling various purposes according to a customer's needs. Examples of purpose-built upper body structures 1 may include cargo transportation, such as last-mile delivery or similar, passenger transportation, such as autonomous shuttle services, buses, and taxis, and the like.

In the example of FIG. 1, the vehicle platform 2 is U-shaped, while the upper body structure 1 is formed according to a complementary V shape. It is to be understood that the shape and configuration depicted in FIG. 1 is merely an example. Other shapes and configurations are of course possible, such as a flat vehicle platform 2 with a box-shaped upper body structure 1 on top of it.

As can be seen, only the vehicle platform 2 has wheels and can therefore move around. The upper body structure 1 on the other hand has to be moved, carried and/or transported by secondary means, such as a crane, a hydraulic lifting platform, or the like.

The motor vehicle 100 may be, for example, autonomously and/or automatically driven and may be equipped with various sensor systems as they are known in the art in order to monitor the environment and generate appropriate steering commands. Such sensors may also be utilized to monitor and steer the loading/unloading process of the motor vehicle 100. Electric power may be provided by an electric battery (not shown), which may be installed at a bottom area of the motor vehicle 100, and in one example, within the vehicle platform 2.

As mentioned above, specific technical solutions need to be provided for the depicted example in order to mount the upper body part 1 on top of the vehicle platform 2 and to swap and/or exchange different upper body parts 1. Such structural provisions and/or devices usually add to the overall system costs. Moreover, mounting the upper body part 1 with such conventional solutions may be time consuming.

With reference to FIGS. 2-6, an alternative design according to an embodiment of the present disclosure is described below that overcomes these drawbacks. The mounting system 10 described with reference to these figures provides a simple and quick swapping concept that solves one of the main challenges for PBVs, namely, how to load an upper body structure 1 onto a vehicle platform 2 and how to unload it from there.

As will is explained below, the present solution makes it possible to load and unload the upper body structure 1 in one swift and flexible procedure without having to lift heavy loads or adjust heights. In this case, both the upper body structure 1 and the vehicle platform 2 are provided with wheels 3 and are thus able to move around freely and independently. Loading and unloading is possible in this case simply by moving both of the parts 1 and 2 together laterally as is described below in detail.

The upper body structure 1 and the vehicle platform 2 are both equipped with ball-type wheels 3 that are able to roll into arbitrary horizontal directions and facilitate relative lateral movement of both parts of the parts 1 and 2 on the ground with regards to a respective longitudinal direction 14. The upper body structure 1 and the vehicle platform 2 may be configured with equally sized wheels 3 and may have the same ride height in order to facilitate a barrier free mounting concept, which makes traditional lifting mechanisms obsolete.

Figure 2:
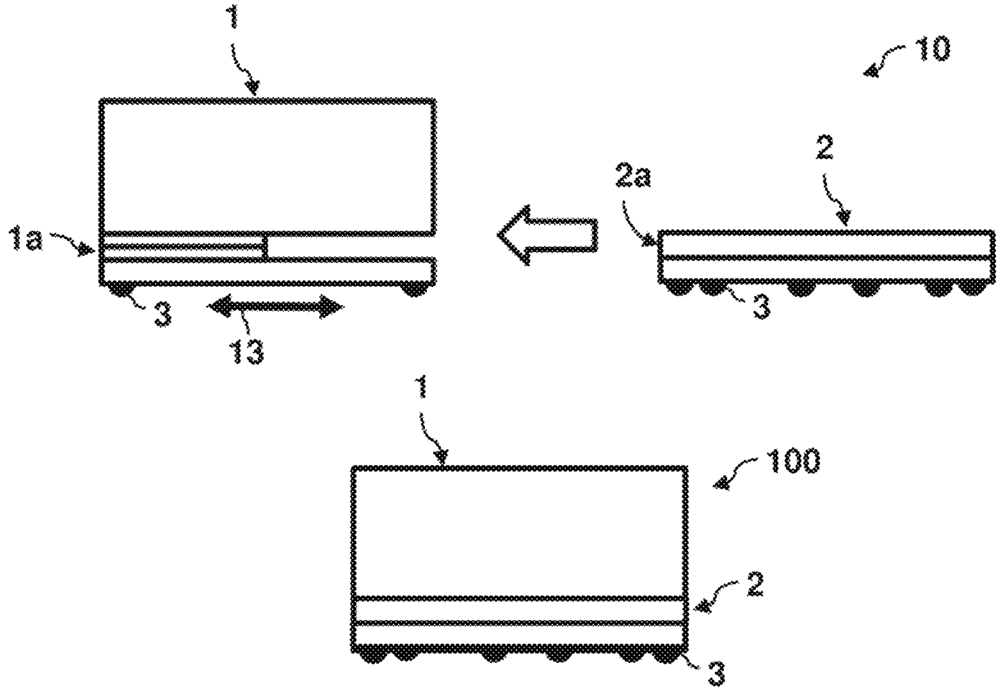
FIG. 2 schematically shows a front view of a mounting system for mounting an upper body structure laterally onto a vehicle platform of a motor vehicle according to an embodiment of the disclosure.
Figure 3:
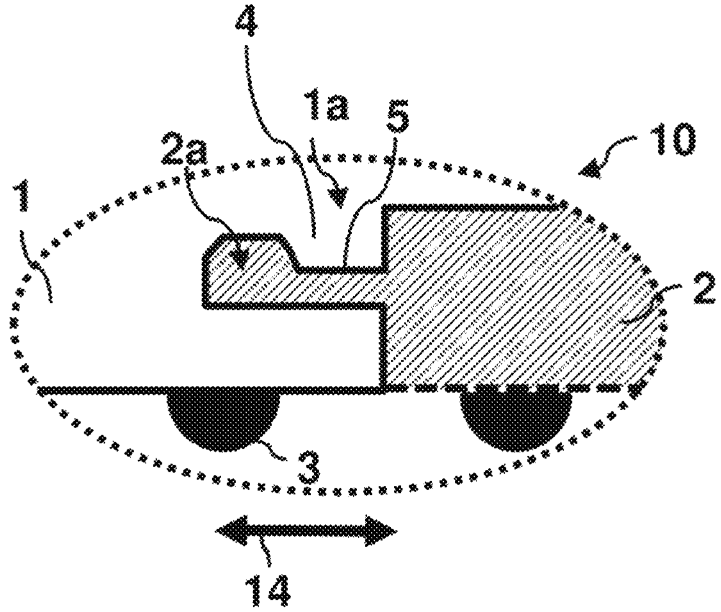
FIG. 3 schematically shows a detailed lateral cross-sectional view of the system in FIG. 2.

The upper body structure 1 is configured with an engagement portion 1*a* and the vehicle platform 2 is configured with a complementary shaped counter-engagement portion 2*a*. The engagement portions 1*a* and 2*a* are shaped to engage each other in a form fit manner under relative lateral movement of the upper body structure 1 and the vehicle platform 2 towards each other, as illustrated in FIG. 2. In this example, the upper body structure 1 and the vehicle platform 2 are coupled to each other for joint longitudinal movement.

Figure 4:
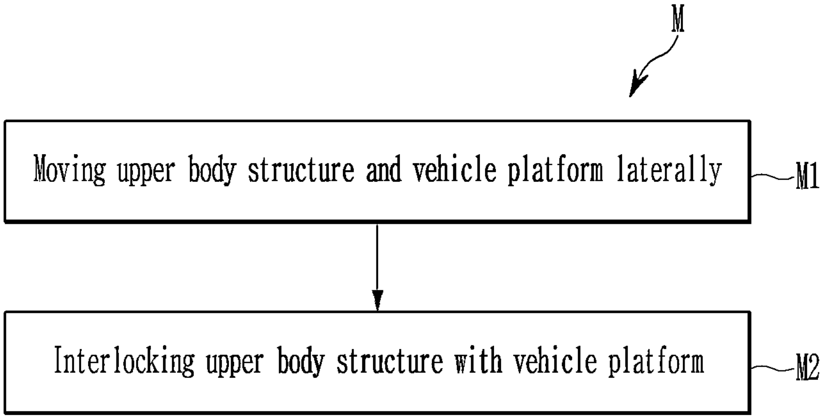
FIG. 4 shows a flow diagram of a method for mounting the upper body structure laterally onto the vehicle platform of FIG. 2.
Figure 5:
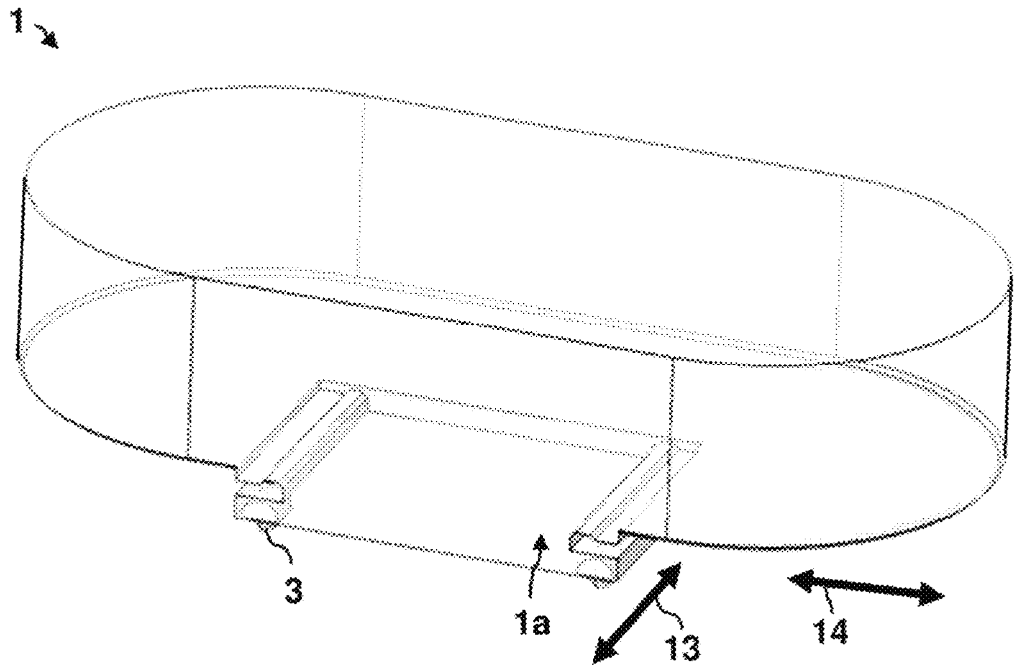
FIG. 5 is a detailed perspective side view of the upper body structure of the system of FIG. 2.
Figure 6:
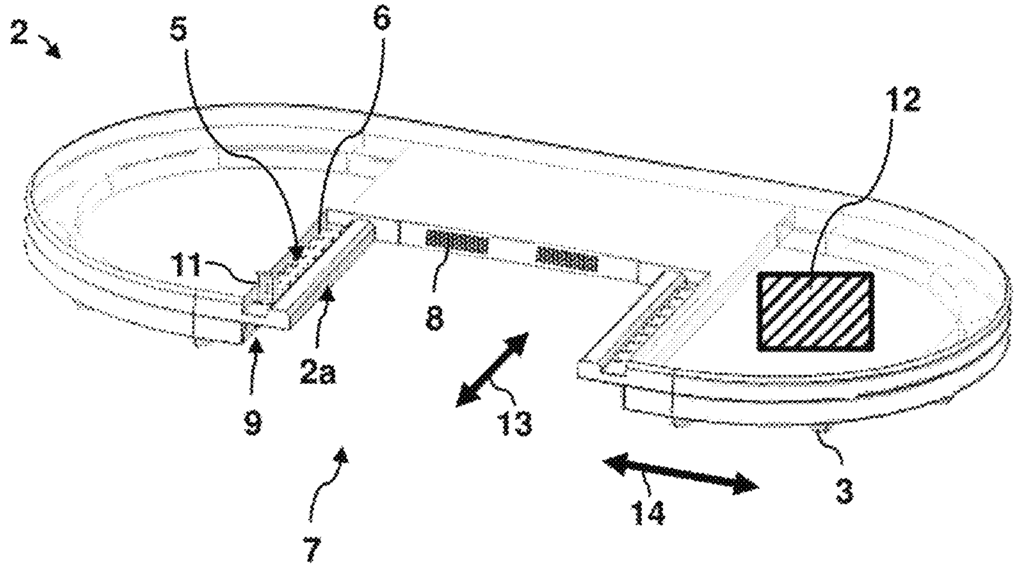
FIG. 6 is a detailed perspective side view of the vehicle platform of the system of FIG. 2.

The specific shape of the portions 1*a*, 2*a* can be best understood with reference to FIGS. 4-6. As can be seen, the counter-engagement portion 2*a* is formed as a protrusion and the engagement portion 1*a* is formed correspondingly as a recess such that the protrusion can enter the recess laterally. The recess 1*a* is formed with a lateral ridge 4 fitting into a correspondingly formed lateral undercut 5 of the protrusion 2*a* to couple the upper body structure 1 and the vehicle platform 2 to each other for joint longitudinal movement.

As detailed in FIGS. 5 and 6, the vehicle platform 2 features a recess at one lateral side. Both longitudinal ends of the recess are provided with the above structure, namely with a protruding counter-engagement portion 2*a* of a particular shape. The upper body part 1 is formed with a complementary shape on this lateral side such that it fills up the recess of the vehicle platform 2. The protruding counter-engagement portions 2*a* of the vehicle platform 2 are accommodated within openings of its engagement portion 1*a*.

To ease the coupling procedure, the undercut 5 is formed as a groove and configured with roller wheels or bearings 6 to facilitate lateral sliding movement of the protrusion along the recess.

The mounting system 10 further comprises a two-part interlocking mechanism 7 configured to interlock the upper body structure 1 with the vehicle platform 2 in the engaged configuration.

As a first aspect, the interlocking mechanism 7 comprises one or several electromagnets 8 integrated in the vehicle platform 2 that are configured to be activated in the engaged configuration to generate a magnetic force pulling the upper body structure 1 and the vehicle platform 2 to each other. To this end, the upper body structure 1 may comprise a metallic material at the engagement portion 1*a*, e.g. steel.

As second aspect, the interlocking mechanism 7 comprises a mechanical interlock 9 configured to mechanically lock the upper body structure 1 with the vehicle platform 2 in the engaged configuration via mechanical locking elements 11. As can be seen in FIG. 6, the mechanical locking elements 11 are retractable pins positioned at the outer lateral end of the undercut 5.

In one example, the mechanical locking elements 11 may be integrated together with the roller wheels 6. To this end, one roller wheel 6 may be installed on top of a retractable pin. The retractable pins may be driven by an electric motor via a ball-screw drive or similar (rotational movement is converted to linear motion such as up and down, which creates the mechanical lock).

As indicated in FIG. 6, the vehicle platform 2 includes an electric battery 12 configured to power the wheels 3 as well as the interlocking mechanism 7, i.e., the electromagnet 8 and the mechanical interlock 9, via respective electric motors (not shown here). The upper body structure 1 may also comprise an electric battery for powering its wheels 3 (via one or several electric motors not shown here). It is to be understood however that the wheels 3 of the upper body structure 1 do not necessarily have to be driven electrically or in any other way but may merely be passive devices.

A corresponding method M may then include operation M1 of moving the upper body structure 1 and the vehicle platform 2 laterally relative to each other via the wheels 3. The two parts 1 and 2 are moved such that the engagement portion 1*a* of the upper body structure 1 engages with the counter-engagement portion 2*a* of the vehicle platform 2. The upper body structure 1 and the vehicle platform 2 are thereby coupled to each other for joint longitudinal movement. Next, the method M includes operation M2 of interlocking the upper body structure 1 with the vehicle platform 2 in the engaged configuration by the interlocking mechanism 7. First, the electromagnet 8 may be activated to pull both of the parts 1 and 2 together. Next, the mechanical interlock 9 may be closed to lock both of the parts 1 and 2 securely together.

In the foregoing detailed description, various features are grouped together in one or more examples with the purpose of streamlining the disclosure. It is to be understood that the above description is intended to be illustrative, not restrictive. The present disclosure is intended to cover all alternatives, modifications, and equivalents of the different features and embodiments. Many other examples should be apparent to one of ordinary skill in the art upon reviewing the above specification. The embodiments were chosen and described in order to explain the principles of the disclosure and its practical applications, to thereby enable others having ordinary skill in the art to utilize the disclosure and various embodiments with various modifications as are suited to the particular use contemplated.

REFERENCE LIST

1 upper body structure
1*a* engagement portion
2 vehicle platform
2*a* counter-engagement portion
3 wheel
4 lateral ridge
5 lateral undercut
6 roller wheel
7 interlocking mechanism
8 electromagnet
9 mechanical interlock
10 mounting system
11 mechanical locking element
12 electric battery
13 lateral direction
14 longitudinal extension
100 motor vehicle
M method
M1, M2 method steps, i.e., operations

What is claimed is:

1. A mounting system for a motor vehicle:

an upper body structure;

a vehicle platform;

wheels on at least one of the upper body structure or the vehicle platform whereby the upper body structure or the vehicle platform is movable laterally on the ground with regards to a respective longitudinal direction;

an engagement portion on the upper body structure; and a counter-engagement portion on the vehicle platform and having a complementary shape relative to the engagement portion, wherein the engagement and counter-engagement portions are shaped to engage each other under relative lateral movement of the upper body structure and the vehicle platform towards each other via the wheels whereby the upper body structure and the vehicle platform are coupled to each other in an engaged configuration for joint longitudinal movement, wherein at least one of the upper body structure or the vehicle platform includes an interlocking mechanism configured to interlock the upper body structure with the vehicle platform in the engaged configuration, wherein the interlocking mechanism includes an electromagnet configured to be activated in the engaged configuration and to generate a magnetic force pulling the upper body structure and the vehicle platform to each other.

2. The mounting system according claim 1, wherein both the upper body structure and the vehicle platform are equipped with the wheels.

3. The mounting system according to claim 1, wherein the wheels each include a ball and are configured to roll in horizontal directions.

4. The mounting system according to claim 1, wherein the engagement portion and the counter-engagement portion are shaped to engage each other in a form fit manner.

5. The mounting system according to claim 1, wherein the engagement portion or the counter-engagement portion is formed as a protrusion and the respective other portion is formed correspondingly as a recess such that the protrusion can enter the recess laterally, and wherein at least one of the protrusion and the recess is formed with a lateral ridge fitting into a correspondingly formed lateral undercut of the respective other portion to couple the upper body structure and the vehicle platform to each other for joint longitudinal movement.

6. The mounting system according to claim 5, wherein the undercut is formed as a groove, which is configured with roller wheels or bearings to facilitate lateral sliding movement of the protrusion along the recess.

7. The mounting system according to claim 1, wherein the vehicle platform comprises an electric battery, which is configured to power at least one wheel of the wheels, and an interlocking mechanism.

8. A motor vehicle having a mounting system, the motor vehicle comprising:
- an upper body structure; and
- a vehicle platform,
- the mounting system including
  - wheels on at least one of the upper body structure or the vehicle platform whereby the upper body structure or the vehicle platform is movable laterally on the ground with regards to a respective longitudinal direction,
  - an engagement portion on the upper body structure, and
  - a counter-engagement portion on the vehicle platform and have a complementary shape relative to the engagement portion,
- wherein the engagement and counter-engagement portions are shaped to engage each other under relative lateral movement of the upper body structure and the vehicle platform towards each other via the wheels whereby the upper body structure and the vehicle platform are coupled to each other in an engaged configuration for joint longitudinal movement,
- wherein at least one of the upper body structure or the vehicle platform includes an interlocking mechanism configured to interlock the upper body structure with the vehicle platform in the engaged configuration,
- wherein the interlocking mechanism includes an electromagnet configured to be activated in the engaged configuration and to generate a magnetic force pulling the upper body structure and the vehicle platform to each other.

9. The motor vehicle according to claim 8, wherein the motor vehicle is an electric motor vehicle.

10. A method for assembling a motor vehicle, the method comprising:
- moving an upper body structure and a vehicle platform laterally relative to each other via wheels provided on at least one of the upper body structure and the vehicle platform such that, in an engaged configuration, an engagement portion of the upper body structure engages a counter-engagement portion of the vehicle platform having a complementary shape relative to the engagement portion thereby coupling the upper body structure and the vehicle platform to each other for joint longitudinal movement; and
- interlocking the upper body structure with the vehicle platform in the engaged configuration by an interlocking mechanism provided on at least one of the upper body structure or the vehicle platform,
- wherein interlocking includes activating an electromagnet to generate a magnetic force pulling the upper body structure and the vehicle platform to each other.

11. The method according to claim 10, wherein the method comprises a method of assembling an electric motor vehicle.

* * * * *